United States Patent [19]

Pfisterer, Jr.

[11] 3,902,111

[45] Aug. 26, 1975

[54] CONTROLLER OUTPUT CIRCUIT

[75] Inventor: George J. Pfisterer, Jr., Philadelphia, Pa.

[73] Assignee: Leeds & Northrup Company, North Wales, Pa.

[22] Filed: May 31, 1974

[21] Appl. No.: 475,221

[52] U.S. Cl. ................. 323/19; 330/30 D; 323/100

[51] Int. Cl.$^{2}$ ............................................ G05F 1/56

[58] Field of Search ................. 323/16, 19, 20, 100; 330/30 D

[56] References Cited

UNITED STATES PATENTS

| | | | |
|---|---|---|---|
| 3,602,804 | 8/1971 | Randall | 323/20 |
| 3,611,115 | 10/1971 | Siebers | 323/19 |
| 3,781,605 | 12/1973 | Emerson | 323/100 |
| 3,826,969 | 7/1974 | Eichelberger et al. | 323/19 |
| 3,852,658 | 12/1974 | Braun et al. | 323/16 |

*Primary Examiner*—Gerald Goldberg
*Attorney, Agent, or Firm*—William G. Miller, Jr.; Raymond F. MacKay

[57] ABSTRACT

A process controller having an output circuit with a grounded true voltage and current output supplied by a grounded source is provided by using a differential amplifier as an output amplifier driving a transistor so that its emitter-collector path carries an output current from a grounded source through a dropping resistor and the current output. Another differential amplifier with negative feedback is connected across the dropping resistor by a resistance network so that it compares a fraction of the voltage on the high side of the dropping resistor with the same fraction of the difference between its output and the voltage on the lower side of the dropping resistor. By way of the feedback to the output amplifier the compared voltages are kept equal.

3 Claims, 1 Drawing Figure

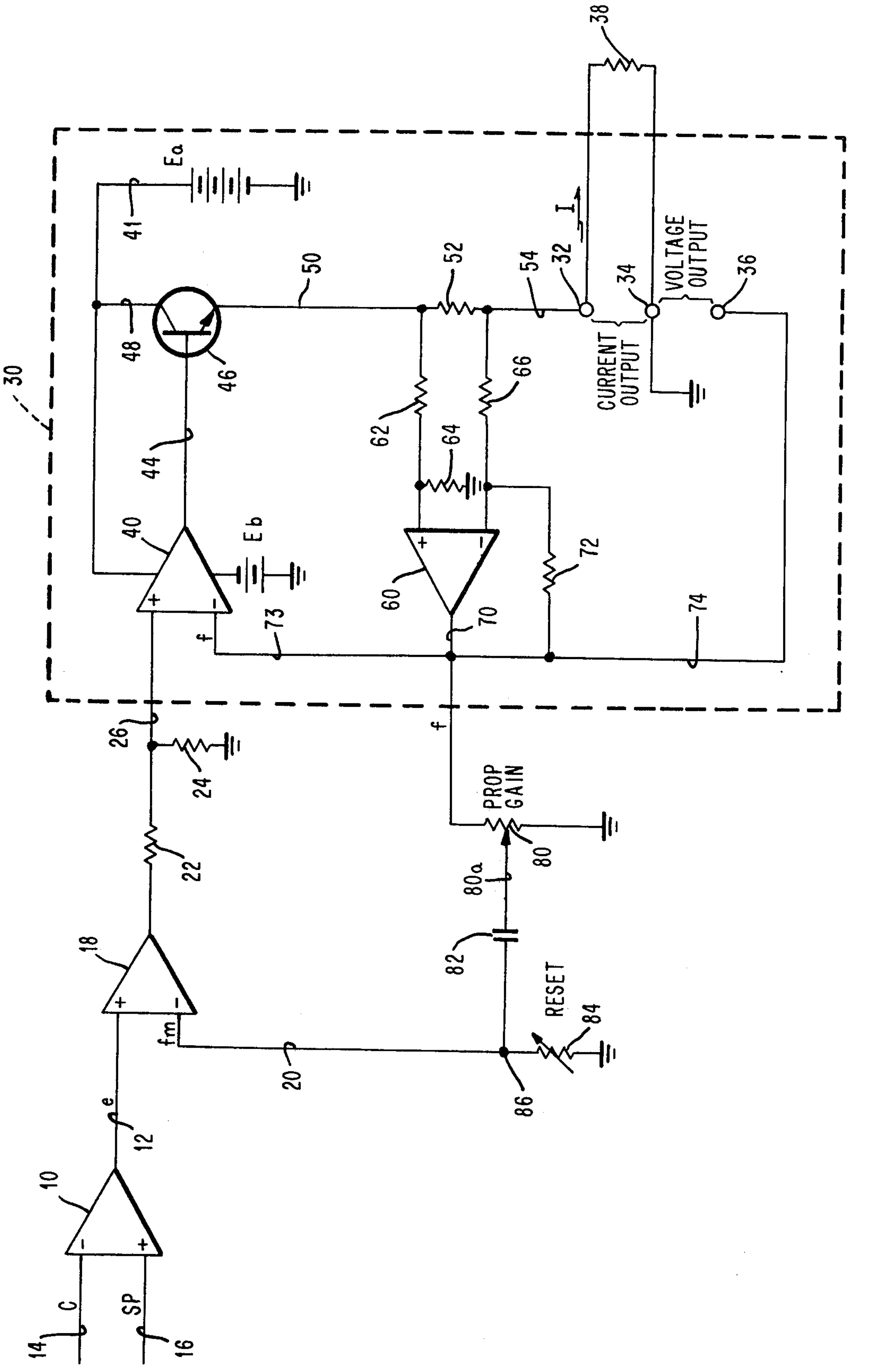
CURRENT OUTPUT
VOLTAGE OUTPUT
PROP GAIN
RESET
Ea
Eb

CONTROLLER OUTPUT CIRCUIT

BACKGROUND OF THE INVENTION

This invention relates to process controllers, and more specifically, to output circuits for process controllers.

In the past, process controllers of the analog type have usually had their output circuits floating (not tied to ground) or they have utilized a floating power source when the output circuits were tied to ground. It is advantageous to provide output circuits for controllers which have one terminal grounded and it is also advantageous to utilize, wherever possible, a grounded power supply. One advantage of using grounded output circuits is the fact that such circuits require only a single barrier device where they are utilized to feed control devices in dangerous areas, whereas with floating output circuits, two barrier devices are required.

It is therefore an object of this invention to provide an output circuit for a controller which provides grounded voltage and current output while utilizing a grounded power supply as a source of output power.

SUMMARY OF THE INVENTION

In carrying out this invention, the novel control circuit utilizes a differential output amplifier system which is responsive to the difference between a control signal in the form of a varying voltage and a feedback signal corresponding to the voltage output of the control circuit. The output of the amplifying system is fed through a voltage dropping resistor to one of a pair of current output terminals, the other terminal is connected to ground. In addition, the control circuit has a differential feedback amplifier circuit having negative feedback with the feedback amplifier connected across the dropping resistor so that the output from the feedback amplifier provides a voltage output signal between the output of the differential feedback amplifier and ground. The voltage output signal is, of course, maintained equal to the control signal and acts as the feedback signal to the differential output amplifier system.

BRIEF DESCRIPTION OF THE DRAWING

The single FIGURE shows an analog control circuit which utilizes the output circuit of the present invention.

DESCRIPTION OF THE PREFERRED EMBODIMENT

In the figure the analog control circuit shown utilizes a differential amplifier 10 to produce at its output 12 a signal *e*, representing the error between the magnitude of the signal on line 14 (the controlled variable *c*) and the magnitude of the signal on line 16 (the set point sp for the controlled variable). As shown, the signal c is supplied at the inverting input of the amplifier 10 and the set point signal is supplied at the non-inverting input. The result of the comparison of those signals, namely the signal *e* on line 12, is supplied to the non-inverting input of a control amplifier of the differential type identified by reference character 18. The control amplifier 18 compares the error signal e with a modified feedback signal $f_m$ which appears on line 20 and to which further reference wil be made below.

The output of the control amplifier 18 is divided by the voltage divider made up of resistors 22 and 24 so that there appears on line 26 a control signal as an input to the controller output circuit 30. The control signal is indicative of the desired change in the manipulated variable of the process being controlled to bring the control variable c to equality with the set point sp.

The output circuit 30 provides both a current output and a voltage output. The curren' output is supplied between the terminal 32 and the grounded terminal 34 while the voltge output is supplied between the terminal 36 and the grounded terminal 34. As shown in the figure, the current load 38 is connected across the current output, while the voltage output is shown disconnected. When only a voltage output is needed it is, of course, necessary to connect a jumper across the current output terminals to provide a complete circuit.

It will be understood by those familiar with process controllers that the current output device represented by the resistor 38 may, for example, be an electropneumatic converter or a magnetic amplifier, for example. The voltage output can advantageously be used in connecting the control circuit of the figure in cascade with another control circuit or the voltage output can be used in conjunction with summers and manual loading stations.

As shown in the FIGURE, the output circuit 30 has its input on line 26 connected to the non-inverting input of the differential output amplifier system which is made up of differential amplifier 40 and transistor 46. The inverting input of amplifier 40 receives a feedback signal *f*. The amplifier 40 of the amplifier system is shown as being supplied by two grounded power sources, namely the power source $E_a$ and the power source $E_b$. There is produced an output on line 44 from the amplifier 40, a signal to the base of transistor 46, shown here as an NPN transistor. Transistor 46 acts to provide additional amplification to supply the necessary current output where amplifier 40 is inadequate in that respect. When amplifier 40 is capable of supplying sufficient output current then transistor 46 can be omitted and amplifier 40 would have its output line 44 connected directly to line 50 and line 48 would be omitted.

The power source $E_a$ is connected to provide a positive potential on the collector of the transistor 46 by way of lines 41 and 48. The emitter of transistor 46 is then connected to line 50 so that the power source $E_a$ by virtue of lines 41, 48 and 50 forms a series circuit with the emitter-collector path of transistor 46. That series circuit is then connected in series with the voltage dropping resistor 52 which is in turn connected to terminal 32 so that there is formed a series output circuit consisting of the grounded power source $E_a$, lines 41 and 48, the emitter-collector path of transistor 46, line 50, dropping registor 52, and line 54 to the terminal 32. The current load 38 connects between terminal 32 and the grounded terminal 34. In that circuit the output current I is related to the potential at the output of amplifier 40, namely on line 44 as it is applied to the base of transistor 46.

To provide both the feedback signal f to the inverting input of amplifier 40 and also the voltage output between terminals 36 and 34 there is utilized a differential feedback amplifier 60 which has its non-inverting input supplied through an input resistor 62 from one side of the voltage dropping resistor. The same non-inverting input of amplifier 60 is connected to ground through resistor 64 so that the potential which appears at the non-inverting input of resistor 64 is a fraction of the potential at one terminal of the dropping resistor 52.

The inverting input of amplifier 60 is supplied through the input resistor 66 from the opposite side of dropping resistor 52 and the inverting input is also connected to the output line 70 of amplifier 60 by way of feedback resistor 72.

The output of amplifier 60 on line 70 is then connected through line 73 as the feedback signal f to the inverting amplifier 40 and also by way of line 74 to the terminal 36 to provide the voltage output from the circuit 30.

It will be evident that the value of the feedback signal $f$ will be kept in equality with the signal on line 26 and that the value of the inputs to the amplifier 60 will be kept in equality by virtue of the negative feedback through resistor 72. Advantageously, the resistors 62, 64, 66 and 72 may all be of the same value, however, it is only necessary that the ratio of the value of resistors 64 to the value of 62 be the same as the ratio of resistor 72 to resistor 66 to maintain the same ratio between the output of amplifier 60 and the voltage drop across the resistor 52.

The feedback signal from line 70 is utilized to provide the proportional and reset control functions of the controller. The feedback signal is first fed through the potentiometer slidewire 80 to ground. The proportional gain is then established by the setting of the contact on that slidewire, namely contact 80*a*. The contact 80*a* is then connected through the reset capacitor 82 and through the adjustable reset resistor 84 to ground. The junction between resistor 84 and capacitor 82, namely junction 86 is connected through line 20 to the amplifier 18, where it supplies the modified feedback signal $f_m$ to the inverting input. It will thus be evident that as the error on line 12 changes, the amplifier 18 modifies, by way of the output circuit 30, the controller output, whether it be current output or voltage output, and also modified in a proportional manner the feedback signal $f$. The signal $f$ is in turn modified in accordance with the desired proportional gain and the desired reset time as established by the setting of contacts 80*a* and the adjustment of resistor 84 to supply the feedback signal $f_m$ to equal the changed error $e$.

It will be evident to those skilled in the art that the output circuit 30 may be utilized to provide the necessary output signals for whatever control device is being used in response to a signal on line 26. The signal on line 26 may be produced by a device other than a control amplifier; for example, the signal on line 26 may be produced from a potentiometer supplied by a power source and adjusted manually so as to provide a manual adjustment of the control device connected to the output terminals of the circuit 30.

As an example of the components and component values that may be utilized in the output circuit 30 the following list can be used where the signal on line 26 varies from 1 to 5 volts and a voltage output over the range of 1 to 5 is desired with a current range of 4–20 mA. The useful current load range is 0–600 ohms and the voltage output should be connected to at least a 1200 ohm resistive load.

$E_a$ = 24v.
$E_b$ = 8.2v.
Resistor 62, 64, 66 and 72 = 100 k
Resistor 52 = 250 ohms
Amplifiers 40 and 60 = No 741 operational amplifier
Transistor 46 = 2N2219A It is usually advantageous to prevent the possibility of an output circuit of this type from going into oscillation. This can be accomplished in a circuit having the parameters listed above by shunting resistor 64 by a series circuit including a 470 ohm resistor and a 0.001 μf. capacitor. Also, the resistor 72 should be shunted by a 0.001 μf. capacitor.

What is claimed is:

1. A control circuit for producing in response to a control signal a proportional grounded voltage and grounded current output from a grounded power source comprising:

a differential output amplifier system for producing an output responsive to the difference between a control signal in the form of a varying voltage indicative of the desired voltage output signal and a feedback signal corresponding to the actual voltage output, a grounded power source connected to supply said amplifier system, a voltage dropping resistor having one end connected to receive the output from said amplifying system, a pair of current output terminals, one of said terminals being connected to the other end of said resistor and the other terminal being connected to ground so that any current load connected across said terminals is in series with said resistor, and a differential feedback amplifier circuit having negative feedback, said feedback amplifier being connected across said dropping resistor by a resistor network so that the feedback amplifier produces the actual voltage output in a predetermined relationship to the current output.

2. A control circuit for producing in response to a control signal a proportional grounded voltage and grounded current output from a grounded power source comprising:

a differential output amplifier responsive to the difference between a control signal in the form of a varying voltage indicative of the desired change in the manipulated variable of a process and a feedback signal corresponding to said voltage output, a grounded power source, a transistor having its base connected to the output of said differential output amplifier and its emitter and collector connected in circuit with said grounded power source to produce through its emitter-collector path an output current of magnitude related to the output from said amplifier, a voltage dropping resistor connected to form a series circuit with said source and said emitter-collector path, a pair of current output terminals, one of said terminals being connected to said series circuit and the other terminal being connected to ground so that any current load connected across said terminals is in series with said series circuit, and a differential feedback amplifier connected with an input resistor between each of its inputs and opposite sides of said dropping resistor with the non-inverting input connected to ground through a resistor and the inverting input connected to the amplifier output through a feedback resistor so that the feedback amplifier output provides the voltage output signal of said control circuit in magnitude equal to said control signal.

3. A control circuit for producing in response to a control signal a voltage and current output comprising:

a differential output amplifier system responsive to the difference between a control signal in the form of a varying voltage indicative of the desired change in the manupulated variable of a process and a feedback signal corresponding to said voltage output, a grounded power source, a transistor having its base connected to the output of said differential output amplifier and its emitter-collector path connected to said grounded power source to produce an output current of magnitude related to the output from said amplifier, a voltage dropping resistor connected to form a series circuit with said source and said emitter-collector path, a pair of current output terminals, one of said terminals being connected to the end of said resistor opposite that connected to said transistor with the other terminal being connected to ground so that any current load connected across said terminals is in series with said series circuit, and a differential feedback amplifier connected with an input resistor between each of its inputs and opposite sides of said dropping resistor with the non-inverting input connected to ground through a resistor and the inverting input connected to the feedback amplifier output through a feedback resistor, all of said resistors being of equal value so that the output of the feedback amplifier provides the voltage output signal between an output terminal and ground which corresponds to the voltage drop across said dropping resistor.

* * * * *